United States Patent [19]
Street

[11] Patent Number: 5,936,774
[45] Date of Patent: Aug. 10, 1999

[54] AUTOSTEREOSCOPIC DISPLAY

[76] Inventor: Graham S. B. Street, Impstone House, Pamber Road Silchester, Reading, Berkshire, United Kingdom

[21] Appl. No.: 09/090,086

[22] Filed: Jun. 4, 1998

Related U.S. Application Data

[63] Continuation of application No. PCT/GB96/03014, Dec. 5, 1996, which is a continuation-in-part of application No. 08/513,787, Aug. 29, 1995, Pat. No. 5,712,732.

[30]     Foreign Application Priority Data

Dec. 9, 1995 [GB]   United Kingdom ................... 9525222
Dec. 29, 1995 [GB]  United Kingdom ................... 9526672

[51] Int. Cl.$^6$ ............................ G02B 27/10; G02B 27/14
[52] U.S. Cl. ............................................ 359/630; 359/619
[58] Field of Search ..................................... 359/618, 619, 359/629, 630, 466; 430/946; 353/69, 82, 7

[56]              References Cited

U.S. PATENT DOCUMENTS

| | | | |
|---|---|---|---|
| Re. 35,029 | 8/1995 | Sandor et al. | 355/22 |
| 3,834,785 | 9/1974 | Kimura | 359/12 |
| 4,641,178 | 2/1987 | Street | 318/57 |
| 4,649,425 | 3/1987 | Pund | 348/52 |
| 4,872,750 | 10/1989 | Morishita | 353/7 |
| 5,287,437 | 2/1994 | Deering | 395/127 |
| 5,414,544 | 5/1995 | Aoyagi | 349/13 |
| 5,467,205 | 11/1995 | Kuba | 349/5 |
| 5,477,385 | 12/1995 | Freeman | 359/629 |
| 5,493,427 | 2/1996 | Nomura | 349/5 |
| 5,583,695 | 12/1996 | Dobrusskin | 359/633 |
| 5,726,800 | 3/1998 | Ezra et al. | 359/466 |

FOREIGN PATENT DOCUMENTS

| | | |
|---|---|---|
| 0118449 | 11/1987 | European Pat. Off. . |
| 0316465 | 5/1989 | European Pat. Off. . |
| 0354851 | 2/1990 | European Pat. Off. . |
| 0477888 | 4/1992 | European Pat. Off. . |
| 0493651 | 7/1992 | European Pat. Off. . |
| 0576106 | 12/1993 | European Pat. Off. . |
| 575257 | 12/1993 | European Pat. Off. . |
| 0625861 | 11/1994 | European Pat. Off. . |
| 0788008 | 6/1997 | European Pat. Off. . |
| 9406249 | 3/1994 | WIPO . |
| 9420875 | 9/1994 | WIPO . |

OTHER PUBLICATIONS

Schwartz, Alfred, 1985 International Display Research Conference, Oct. 15, 1985, San Diego, CA, pp. 141–144, "Head Tracking Stereoscopic Display."

Eichenlaub, J.B., Proceedings on the SPIE: Stereoscopic Displays and Applications IV, vol. 1915, Feb. 1, 1993, San Jose, CA, pp. 177–186, "Developments in Autostereoscopic Technology at Dimension Technologies Inc."

Okoshi, Takanori, Three Dimensional Imaging Techniques, pp. 364–369, Academic Press, 1976.

Isono, Haruo, "Autostereoscopic 3–D Display Using LCD–Generated Active Barrier–Strip", Proceedings on $22^{nd}$ Image Technology Conference, pp. 103–106, 1991.

*Primary Examiner*—Georgia Epps
*Assistant Examiner*—Ricky Mack

[57]               ABSTRACT

Apparatus and method for the display of autostereoscopic images, in which two or more perspective views are generated by a single transmissive display screen, is provided. A structured light source behind the screen directs light through different sets of display elements to correspondingly different viewing zones. In certain embodiments, the structured source comprises a patterned mask which prevents light from passing through a particular set of elements and reaching the wrong zone. The pattern of the mask may be programmed. Observer co-ordinate data permits the correct viewing zone to be co-located with each of the observer's corresponding eyes. A tapered lenticular structure can provide the means for adapting to changes in the observer's distance from the display. In further embodiments a holographic optical element (HOE) may be used instead of an array of conventional lens elements. The HOE typically incorporates the function of providing in conjunction with a suitably located light source the viewing zones required for respective sets of display elements. The display may also be used to provide conventional two-dimensional images at the display screen's full resolution.

26 Claims, 8 Drawing Sheets

AUTOSTEREOSCOPIC DISPLAY

This application is a continuation of International Application No. PCT/GB96/03014, filed Dec. 5, 1996, which is entitled, as a continuation-in-part, to the benefit of the filing date of U.S. application Ser. No. 08/513,787, filed Aug. 29, 1995, now U.S. Pat. No. 5,712,732, both of which are incorporated by reference herein.

This invention relates to the field of three-dimensional imaging and specifically to the provision of stereoscopic images which require no special eye wear to be worn by the observer. Such a display is usually described as autostereoscopic.

BACKGROUND

In patent application PCT/GB94/00405 (Street), which is incorporated by reference herein, various embodiments of apparatus have been described through which two images may be observed, in the form of a stereoscopic image pair. A principal objective of that invention is to track the viewing position of the observer and to ensure that the light corresponding to each image correctly converges to the observer's respective eye locations. Certain embodiments employ one or two liquid crystal display (LCD) screens to achieve this objective. An embodiment, which uses a single LCD screen, relies on the vertical column structure of the LCD to match the pitch of a lenticular screen, placed immediately in front of the LCD surface. Two of the image columns behind each lenticular element provide a left and right eye view to the observer. A difficulty encountered with this approach is that most colour LCD's have a sub-pixel structure in which different colour elements are spaced horizontally. This can present a serious limitation to the use of standard LCD screens for autostereoscopic colour images.

A second embodiment overcomes this difficulty by employing two LCD's positioned at conjugate positions either side of a semitransparent mirror. Behind each LCD the combination of a striped mask or barrier strip screen and a matching lenticular, having the mask's pattern at the focal plane of the lenticular elements, provides a structured light source, the property of which is to pass light to defined regions at the position of the observer, whilst blocking light to adjacent regions. The system is configured to ensure that the light from one LCD is observed at locations spaced from those at which the light from the other LCD is observed. The lateral position and distance of these regions of concentration of light from the display apparatus is controlled to track the location of the observer so that each eye sees the correct image of the stereo pair, whereby a three-dimensional image is observed. The advantage of this arrangement is that the pattern of elements on the LCD need not be constrained by the geometry of the lenticular screen. Additionally, each LCD image retains its full complement of picture elements. There are occasions, however, when cost and/or space constraints make it attractive to employ a single LCD screen to provide both images for the stereo pair. The current invention achieves this whilst preserving the full observer tracking capability of the two LCD configuration described in PCT/GB94/00405. It does this by providing a specially adapted structured light source. This causes the light from alternate rows of elements within the array of picture elements comprising the LCD image to reach only one eye of the observer and the light from the other lines of picture elements only to reach the observer's other eye. In effect, two structured light sources similar to that described in PCT/GB94/00405 are spatially multiplexed to achieve the required result. Other embodiments of this invention provide a structured light source which can direct light from several groups of picture elements, arranged in lines or other configurations, to a corresponding plurality of different locations in space, making the simultaneous presentation of more than two perspectives of a scene possible.

SUMMARY OF THE INVENTION

It is an object of the current invention to provide a fully autostereoscopic image from a single LCD screen.

It is a further object of the invention to provide a compact illumination system together with a potentially large image area.

It is another object of the invention to provide for changes in the observer's viewing distance from the display, as well as for changes in lateral position.

It is also an object of the invention to provide a mode in which the LCD screen operates as a conventional two-dimensional display, without loss of the LCD's intrinsic resolution.

STATEMENTS OF INVENTION

Thus, according to the present invention there is provided apparatus for the display of an autostereoscopic image having at least two perspective views of a scene comprising a source of light; a spatial light modulator (SLM) having a plurality of light modulating elements intermediate an observer and the source of light; and means for structuring the light so that a first perspective view of the scene is seen by one eye of the observer and a second perspective view of the scene is seen by the other eye of the observer, characterised in that said light structuring means includes a light concentrating arrangement which forms, for each view of the image, a set of vertically spaced concentrations of light which is substantially mapped onto a respective set of elements of the SLM.

It is understood that the term vertical herein is used with reference to an observer whose eyes are horizontally spaced.

Advantageously, the light concentrating arrangement comprises a patterned mask comprising light blocking and transmitting regions and an array of convergent optical elements for focusing in a vertical plane the light from a point of the mask substantially at the plane of the SLM.

In certain preferred embodiments the mask is chequered having horizontal rows and substantially vertical columns, each row and column comprising alternate light blocking and transmitting regions. The columns are preferably tapered.

The light blocking and transmitting characteristics for any given region may be in respect of selected portions of the spectral range.

Preferably the light structuring means comprises a further array of convergent optical elements having a horizontal pitch, said further array providing for a row of the mask at least a part of the spectral range of one view and having substantially vertical elongate elements at a pitch corresponding to twice the column pitch of the mask.

Where the columns are tapered, the elements of the further array have a matching taper.

In another embodiment of the invention the mask comprises vertical columns and the light structuring means comprises imaging means for providing horizontally juxtaposed viewing zones corresponding to respective columns of the mask. Conveniently, the imaging means is a lens.

In a further embodiment of the invention the light concentrating arrangement comprises a holographic optical element.

Advantageously the light source comprises vertically spaced compact sources each of which illuminates the holographic optical element with different spectral components.

Preferably control means is provided for tracking the observer's location by controlling the direction in a horizontal plane of the light from the light structuring means in response to the observer's co-ordinate data.

Advantageously the observer's location is tracked by controlling the direction in a horizontal plane of the light from the light structuring means in response to said observer's co-ordinate data, by moving the patterned mask relative to the further array of convergent optical elements.

The observer's lateral position is tracked by relative motion between the patterned mask and the further array of convergent optical elements in a horizontal plane.

Tracking of the observer's distance from the light structuring means is effected by relative motion between the patterned mask and the further array of convergent optical elements along an axis which is substantially aligned with the elongate direction of the elements of the further array. The relative motion between the patterned mask and the further array of convergent optical elements to track the observer's lateral position is in a direction orthogonal to said axis.

Advantageously the patterned mask has a programmable pattern. Tracking of the observer's location is conveniently provided by controlling the direction in a horizontal plane of the light from the light structuring means by programming the pattern.

The mask may be programmed so that, in use, blocking regions become transmitting and transmitting regions to become blocking on a video frame sequential basis.

In preferred embodiments the SLM is a liquid crystal display.

In certain embodiments means is provided, intermediate the observer and the light source, which is electrically switchable between an optically transparent and diffusing state.

In certain embodiments, when the switchable means is diffusing, the SLM provides a two-dimensional image to its full resolution.

In other embodiments, when the switchable means is diffusing, the image of an individual row of modulating elements of the SLM is broadened vertically, thus avoiding the appearance of gaps between the lines comprising each perspective view of the autostereoscopic image.

According to a further aspect of the invention there is provided a method for the display of an autostereoscopic image having at least two perspective views of a scene which comprises providing a source of light; positioning a spatial light modulator (SLM) having a plurality of light modulating elements intermediate an observer and the source of light; and structuring the light from said source so that a first perspective view of the scene is seen by one eye of the observer and a second perspective view of the scene is seen by the other eye of the observer, characterised in that structuring the light includes forming a set of vertically spaced concentrations thereof which substantially map onto a respective set of elements of the SLM.

The invention embraces apparatus for the display of autostereoscopic images comprising a two-dimensional transmissive display having a plurality of juxtaposed rows of light modulating components, each said modulating component providing, in use, a component of an autostereoscopic image; a source of light for viewing in transmission the image provided by said display; and means for structuring said light so that, in use, the light from a first plurality of spaced individual or rows of modulating components for providing at least a first spectral component of a first perspective of the image is seen substantially only by a first eye of the observer and, simultaneously, the light from a second plurality of spaced individual or rows of modulating components for providing said first spectral component of a second perspective of the image is seen substantially only by the second eye of the observer.

The light structuring means typically comprises a patterned mask; a first array of convergent optical elements, each of said first array's elements having its principal convergence in a first orthogonal plane, normal to the focal plane of the element and containing a row of light modulating components, and adjacent ones of said first convergent elements being spaced at a first distance which substantially matches the repetition length of the pattern of said mask in said first orthogonal plane, the mask or an image and/or shadow thereof being located substantially at the focal plane of said first convergent elements; and a second array of convergent optical elements, each of said second array's elements having its principal convergence in a second orthogonal plane, normal to both said first orthogonal plane and said focal plane of the first convergent elements, adjacent ones of said second convergent elements being spaced at a second distance, selected in conjunction with the repetition length of the pattern of said mask or said image and/or shadow thereof in said second orthogonal plane, and the second convergent elements having a focal length so that, in use, the pitch in said second plane of the image formed of the mask's pattern at the plane of the light modulating components substantially matches an integer multiple of the pitch between adjacent rows of said components.

Advantageously the pattern of the mask comprises a regular chequered array of light blocking and transmitting regions on a transparent substrate. A light blocking region for one spectral range may transmit another part of the visible spectrum.

The invention provides for relative movement between the first array of convergent optical elements and the mask or the image and/or shadow thereof provides the control required for tracking the location of the observer.

Advantageously each array of convergent optical elements comprises a lenticular screen.

The structure of said first array of convergent elements may be tapered, having a pitch between the centres of adjacent elements which varies along their length.

Further, in preferred embodiments of the invention, apparatus for the display of autostereoscopic images comprises a two-dimensional transmissive display having a plurality of juxtaposed rows of light modulating components at an image plane, each said modulating component providing, in use, a component of an autostereoscopic image; a plurality of sources of light for providing illumination by emission or transmission, said sources being spaced at a first pitch in a first direction, said direction being orthogonal to the direction of the rows of modulating components; and an array of juxtaposed convergent optical elements located in the optical paths from the sources to the modulating components, each of said array's elements having its principal convergence in a plane orthogonal to the rows of modulating components and spaced at a second pitch, so that, in use, the concentration of light from a first source formed at the image plane in one dimension by a first convergent element is substantially coincident with the concentration of light formed, by a second convergent element adjacent to said first element, at said image plane of a second source, spaced in said first direction from the first source, said first pitch and the focal length of the convergent elements being selected so that the spacing between the concentrations of light formed by one convergent element from light of respective sources adjacent in said first direction is an integer multiple of the pitch between adjacent rows of the light modulating components of the transmissive display, so that the light from a first plurality of spaced individual or rows of modulating components for providing at least a first spectral component of a first perspective of the image is seen substantially only by a first eye of the observer and, simultaneously, the light from a second plurality of spaced individual or rows of modulating components for providing said first spectral component of a second perspective of the image is seen substantially only by the second eye of the observer.

Advantageously, the first direction is disposed vertically and the spaced sources are re-imaged to the location of the observer in the horizontal plane by a convergent optical system placed in the optical path between said sources and the observer.

Conveniently, the sources are provided by a corresponding series of apertures in front of an extended light source. The apertures may be programmable and comprise a spatial light modulator such as an LCD.

In certain embodiments the function of the sources and the convergent optical system may be replaced by providing an emulation thereof by means of a light source and a holographic recording.

According to another aspect of the invention, apparatus for the display of autostereoscopic images comprises a two-dimensional transmissive display having a plurality of juxtaposed rows of light modulating components at an image plane, each said modulating component providing, in use, a component of an autostereoscopic image for an observer; a holographic recording; a source of light for providing illumination for said holographic recording; said recording comprising at least a first and a second array of optically convergent components, each said array providing, in use, a respective array of concentrations of light, the locations of the concentrations of the first array being spaced from the locations of the concentrations of the second array, the light from the first and second arrays being directed respectively towards the first eye and the second eye of the observer and being substantially absent respectively from the second eye and the first eye of the observer; and the locations of said concentrations of light being arranged to coincide with the locations of respective modulating components of the transmissive display, whereby an autostereoscopic image is observed.

Advantageously means for tracking the location of the observer comprises means for selecting the location of the light source to provide the required location of the viewing zones whilst maintaining registration between the pattern of concentrations of light provided by the holographic recording for each said viewing zone and the respective modulating components of the LCD.

According to another aspect of the invention optional means is provided to introduce diffusion of light in the optical path between the patterned mask and the light modulating components, so that in use the structure of the light may be diffused and the two-dimensional transmissive display may provide a two-dimensional image at its full resolution.

BRIEF DESCRIPTION OF THE DRAWINGS

The invention will now be described with reference to FIGS. 1 to 8 in which:—

DETAILED DESCRIPTION OF THE PREFERRED EMBODIMENTS

Figures 1A, 1B:
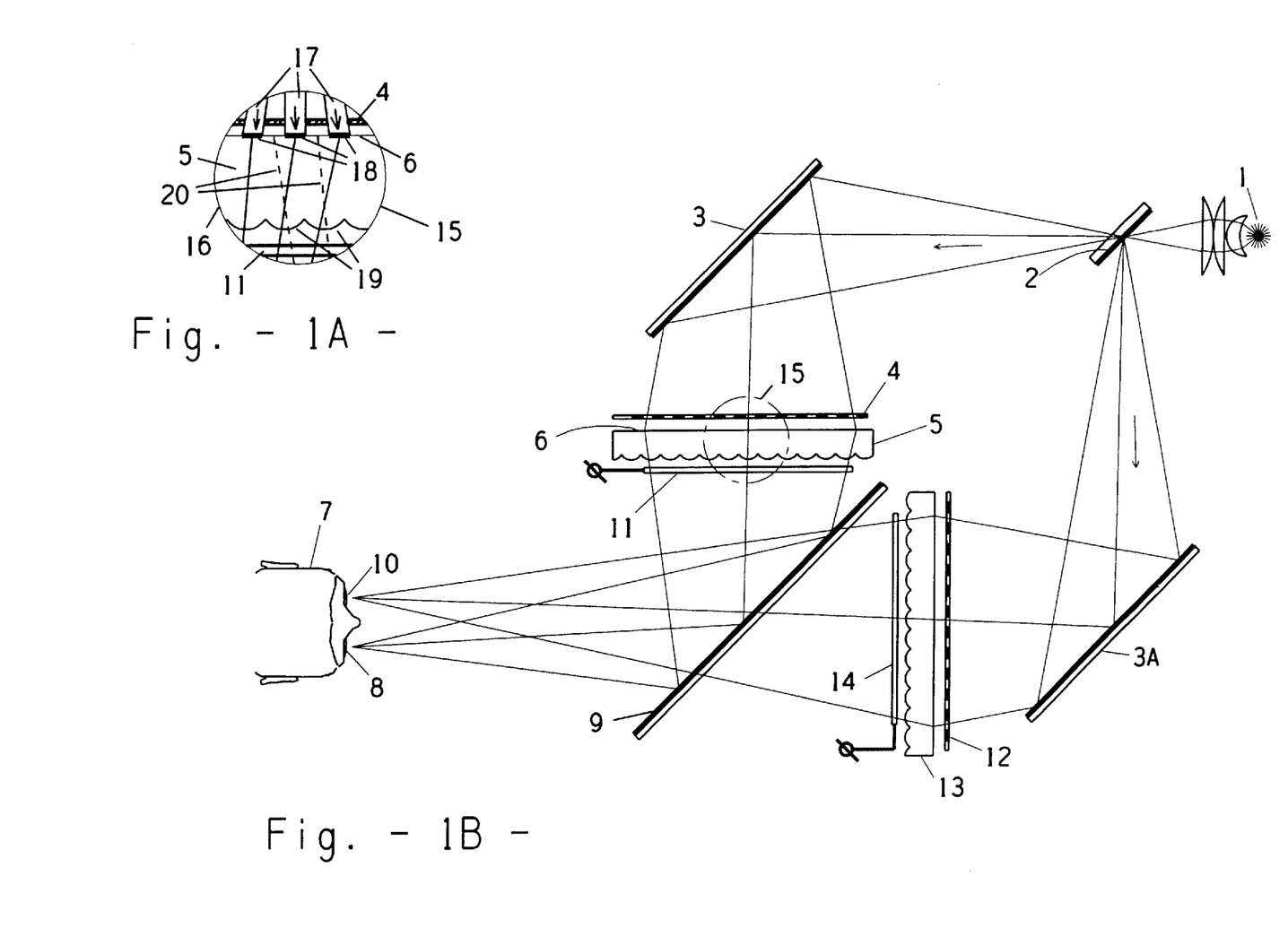
FIG. 1 shows in section the principle of a structured light source in accordance with the prior art.

In FIG. 1, two structured light sources, constructed in accordance with the teachings of PCT/GB94/00405, are shown as part of an autostereoscopic display utilising two image generating screens of the LCD type. Light from a source 1 is split by a semitransparent mirror 2 into two components. Mirror 3 directs approximately 50% of the light to the rear of a barrier strip array or screen 4. This has a series of long vertically extending transmitting apertures spaced so as to substantially match the pitch of a lenticular screen 5.

Screen 5 has a diffusing rear surface 6 on which the barrier screen's shadow produces a pattern of light. This pattern is scaled by adjusting the separation between the two screens until the observer 7 receives light from the entire area of screen 5 with the right eye 8 via a semitransparent mirror 9, whilst the left eye 10 receives substantially no light from screen 5. A second optical channel consists of a mirror 3A, barrier strip array 12, a corresponding lenticular screen 13 and a second LCD panel 14. This arrangement ensures that the left eye sees substantially only light from LCD 14. A small region 15 of the structured light source in the first optical channel is shown enlarged as inset 16 in FIG. 1. Diverging light 17 passes through the barrier strip screen or mask 4 to impinge on the diffusing rear surface 6 of the lenticular 5. Light regions 18 formed on surface 6 are re-imaged by cylindrical lenses 19, causing light to pass through the LCD 11 in directions converging towards the observer's right eye (following reflection by an intermediate mirror). The light paths which would correspond to the observer's left eye are blocked by the opaque regions of the mask 4, and are shown as broken lines 20.

Figure 2:
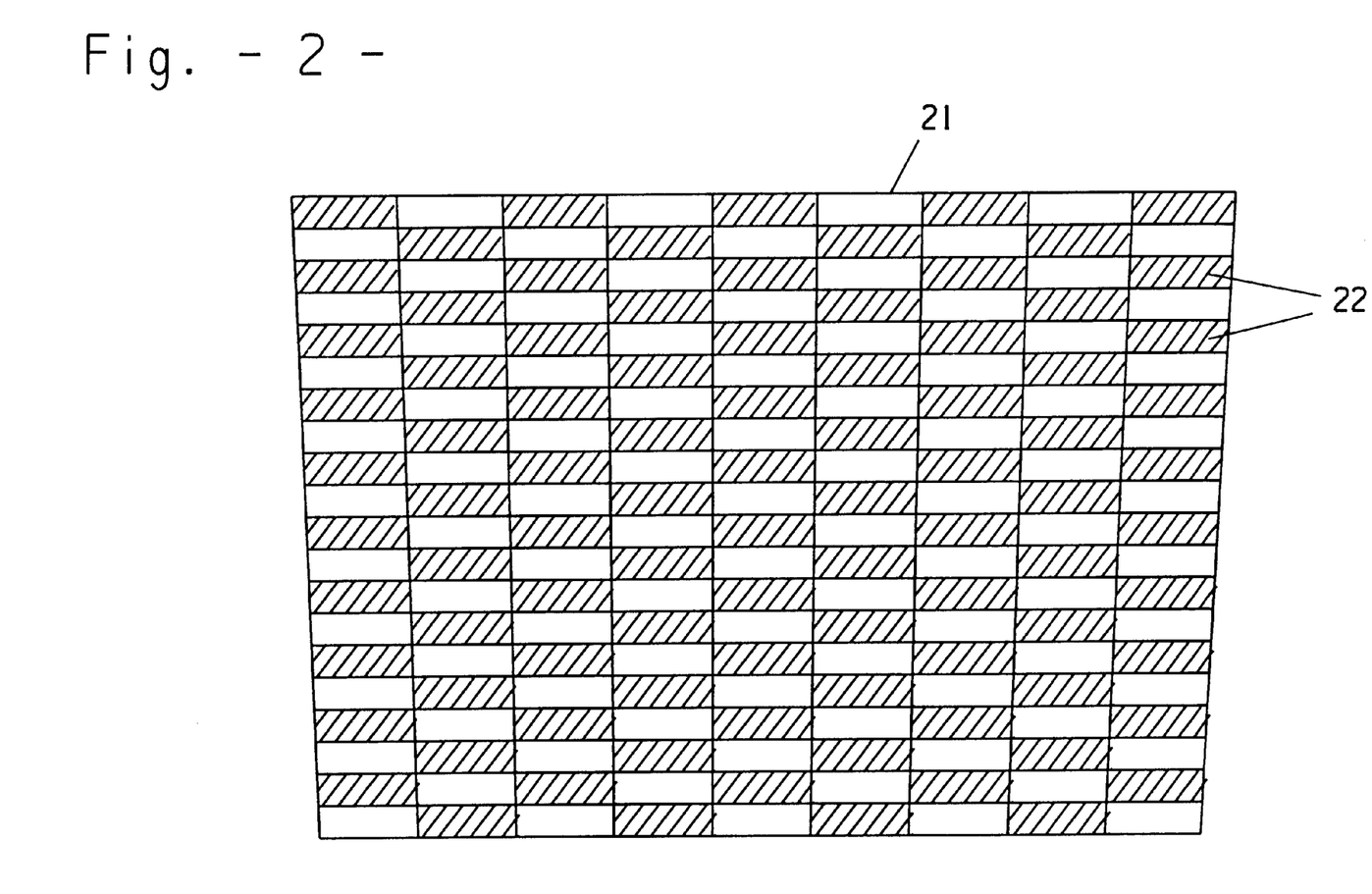
FIG. 2 shows diagrammatically the form of a patterned mask in accordance with the invention.
Figure 3A:
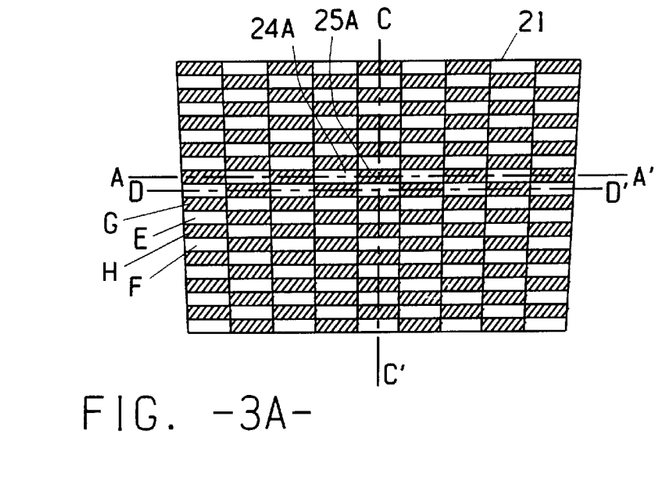
FIG. 3 shows two sections taken at orthogonal planes through a structured light source in accordance with the invention.
Figure 3B:
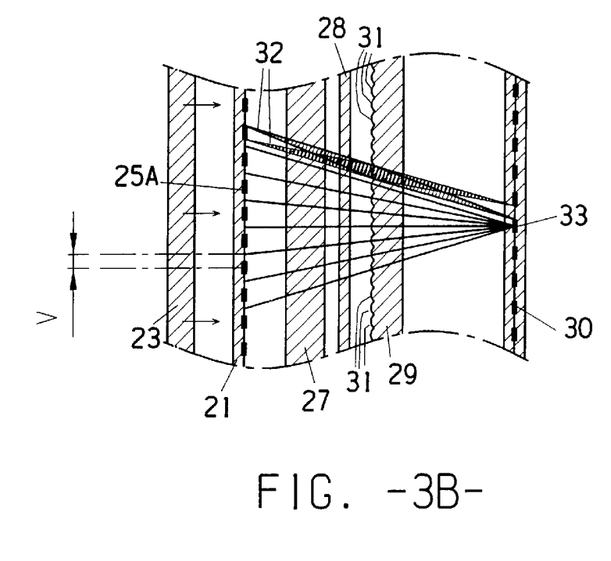
Figure 3C:
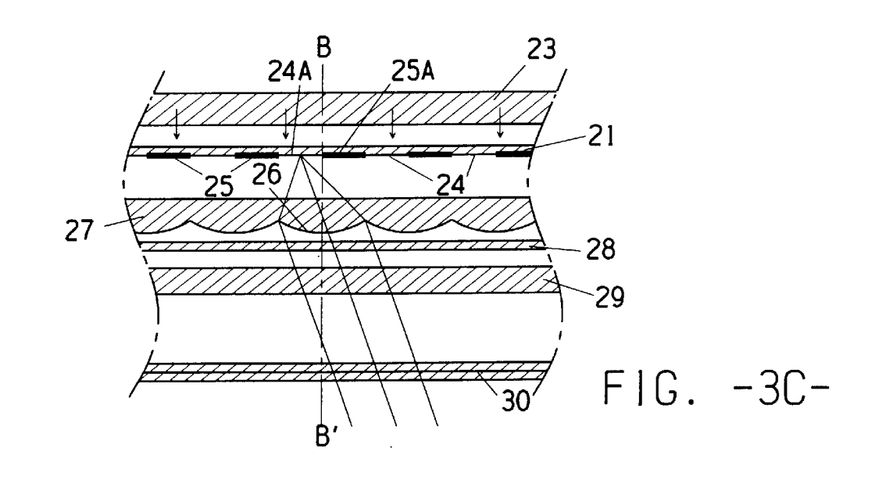

A new kind of barrier screen in the form of a patterned mask is illustrated in FIG. 2. The mask 21 is arranged in rows of substantially rectangular light blocking regions 22. Adjacent rows are arranged in anti phase, thereby creating a chequered pattern. In order to change the convergence of light passing through each row of mask 21 to the location of the observer, without the need to use a shadow mask technique as illustrated in FIG. 1, a tapered horizontal pitch is provided. This matches the taper of a lenticular structure (not shown) having substantially vertically running lenticular elements, as already described in PCT/GB94/00405. Vertical motion of this lenticular screen relative to the mask changes the local pitch of one relative to the other, thereby achieving the necessary convergence control. The mask of FIG. 2 can not perform a useful function with a matching lenticular screen however, unless it is complemented by another lenticular array having its elements running horizontally, the vertical pitch between the centres of such elements corresponding to that between adjacent rows of light blocking regions 22. The combined function of these optical elements together with a suitable LCD screen is illustrated in FIG. 3. For the sake of clarity, neither FIG. 2 nor FIG. 3 are drawn to scale. In practice several hundred convergent optical elements are juxtaposed horizontally for the tapered array and vertically for the other array. The illustrations provided may be regarded as a much enlarged version of a small portion of the display device.

In FIG. 3, the chequered mask element of a structured light source in accordance with the current invention is shown for reference purposes without the other necessary components in order to relate conveniently to two orthogonal sections taken through all the elements of such a structure. All items are drawn much enlarged for the sake of clarity and not to scale. Consequently, the elements illustrated represent only a small part of a real device, where feature size is typically a few tenths of a millimetre and the full dimensions of a display can typically be in excess of 350 mms across its diagonal. Turning first to the horizontal section defined by the line AA' through mask 21 and shown at the bottom of the drawing, there are six components in the assembly. Light is provided by an extended source or backlight 23 of the conventional type. It is uniformly bright, emitting light from its entire area over a relatively large angle. Mask 21, positioned in front of source 23, has alternating light transmitting regions 24 and blocking regions 25 lying along line AA'. A pair of such regions 24A and 25A is located near to the focal plane of a cylindrical element 26 of a tapered lenticular screen 27. The taper of screen 27, which is not illustrated, is arranged to match that of mask 21. The principle of a tapered lenticular screen has already been disclosed in PCT/GB94/00405. It will be clear to those versed in the art that light from region 24A, after passage through element 26, will have a range of directions falling on one side of a vertical plane passing through the boundary between regions 24A and 25A and through the axis of lens 26. The line BB', denoting this plane, is shown as being normal to the plane of the lenticular screen 27, but, in practice, control of the direction of light is achieved by lateral motion of the mask with respect to the lenticular 27. This principle is illustrated in PCT/GB94/00405 for use in tracking an observer's head location. Just as light is passed by region 24A, it is blocked by region 25A, and a dark region is observed on the other side of line BB'. There are three other components in the assembly. The first of these is an electrically operable diffuser 28. Its function is to render the light source unstructured when this is desirable. For three-dimensional viewing, this element is arranged to be transparent and may be ignored for the purpose of the current description.

Before moving to a vertical section of the assembly taken through a plane orthogonal to mask 21, it is appropriate to note that the transmission and blocking of light as a function of angle by the combination of transmitting regions 24, blocking regions 25 and lenticular screen 27 along line AA', is reversed when screen 27 operates in conjunction with the alternating transmitting and blocking regions of the rows vertically adjacent to the row containing regions 24 and 25 on mask 21. The elements of the mask along line DD' are the reverse of their neighbours above and below. We examine this feature of the structure in the vertical section shown at the right side of FIG. 3 and taken through a plane denoted by line CC'.

Mask 21 has light transmitting and blocking regions which alternate vertically. The blocking region 25A appears in both sections. The vertical pitch V between rows is chosen in conjunction with the pitch between the axes of the cylindrical elements of another lenticular structure 29. In this embodiment, this pitch is made substantially equal to the vertical pitch between the rows of an LCD screen 30, although an integer multiple of this pitch would perform the same function. A small degree of scaling of both the pitch of screen 29 relative to that of LCD 30 and the vertical pitch of mask 21 relative to that of screen 29, can be useful in practice. The purpose of this arrangement of components is to achieve a very useful imaging function. For the sake of simplicity, the case where all vertical pitches are equal is dealt with here. The optically equivalent distance in air from mask 21 to the lens elements 31 of screen 29 is arranged to be the same as that of the lens elements 31 to the operative elements of LCD 30. These are typically located in-between two glass plates and associated polarisers. The focal length of cylindrical lens elements 31 is chosen to ensure that rays 32 leaving points on mask 21 are re-imaged to the plane of LCD 30. To a good approximation, particularly as the ratio of the width to focal length of these lens elements is undemanding, each element produces a 1:1 image of the mask's vertical structure. It will be noted that this imaging function only applies in the vertical plane, with the imaging action of vertically adjacent elements acting in coherent fashion. In the horizontal plane, it is the action of lenticular screen 27 which provides the angular characteristics of the light passing through LCD 30. Returning to the earlier observation that adjacent rows of mask 21 provide alternate left and right transmission or blocking characteristics, it will be apparent that this arrangement of components in accordance with the current invention provides a light source with a structure particularly well suited to autostereoscopic three-dimensional viewing. Providing the observer is located with an eye either side of line BB', shown in the horizontal section, and the convergence of the system has been set correctly for the distance between the LCD and observer, in accordance with the teachings of PCT/GB94/00405, light passing through the LCD row containing element 33 will receive light which has originated from alternate rows of mask 21 (D, E, F etc.), thus providing light for the observer's left eye. The same will follow for alternate rows of the LCD. The other half of the LCD's elements will be illuminated with light passing to the observer's right eye, corresponding to the intermediate rows (A, G, H etc.) of mask 21. For a three-dimensional image to be observed, right and left eye image data must be supplied in an interleaved manner to alternate rows of the LCD.

Where the LCD screen comprises a horizontally spaced sub-pixel structure, and different sub-pixels provide different colour components of the image, a modification of the current embodiment can provide a further enhancement to the image. The embodiment as described above provides an image for each eye which consists substantially of one half of the lines of the intrinsic LCD. Some loss of image quality may be observed with horizontal line structure being evident. A technique, previously disclosed in U.S. Pat. No. 4,641,178 (Street), can be applied in a novel manner to the current invention. The mask 21 may be replaced by a transmissive screen having the same pattern of areas. Instead of half the areas being opaque and the other half being transparent, as illustrated in the embodiment of FIG. 3, the transparent regions are replaced with ones which transmit green whilst blocking red and blue light. The opaque regions are arranged to transmit red and blue whilst blocking green light. Another combination, in which green and blue are paired and red is separated may be more convenient. By spatially multiplexing the spectral components of a full colour image in this way, and ensuring that the correct video data is fed to each colour of each row of the LCD, any horizontal line structure may be substantially mitigated, without any substantial loss of vertical resolution. Any horizontal line structure may also be mitigated by introducing some vertical diffusion in front of the LCD. Holographic diffusing elements or other anisotropic micro-optical structures may be conveniently used to accomplish this.

Figure 4:
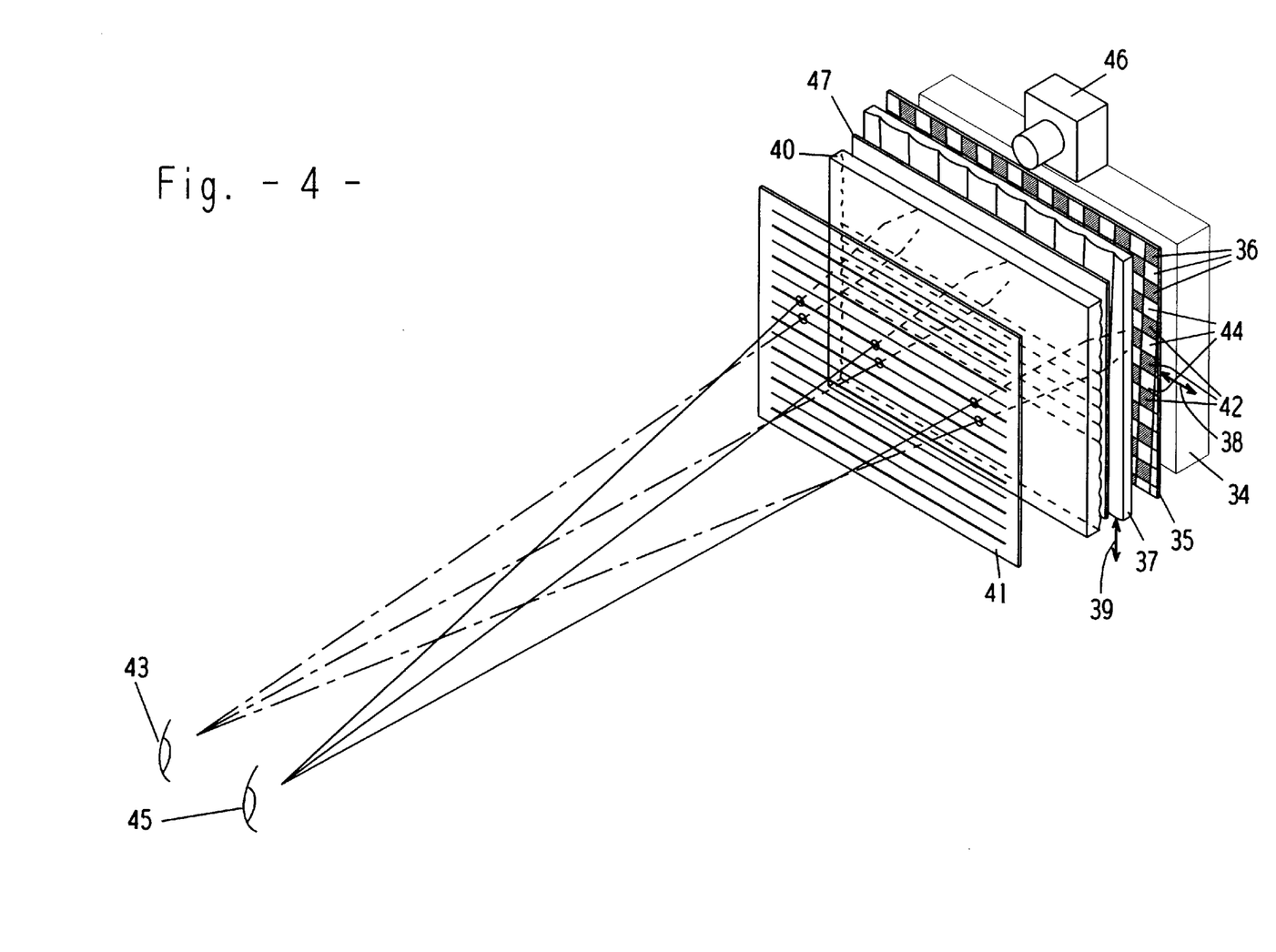
FIG. 4 illustrates diagrammatically a display system constructed in accordance with the invention.

A display system constructed in accordance with the current invention is shown diagrammatically in FIG. 4. An extended diffuse light source 34 provides light through a chequered mask 35. Mask 35 has a vertically tapered pattern of substantially rectangular (strictly trapezoidal) areas or regions 36 arranged in horizontally straight rows. Half of the areas are opaque (shown hatched) and the remainder are transparent. In conjunction with a lenticular screen 37, having its cylindrical elements arranged substantially vertically and a taper corresponding to that of mask 35, the necessary horizontal control of the light's structure is provided by mask 35. Lateral motion 38 of mask 35 relative to screen 37 provides left to right control, whilst vertical motion 39 of screen 37 relative to mask 35 changes the relative pitch at every point of the combined structure, thereby controlling convergence. Each element of a lenticular screen 40, which has its elements arranged horizontally, images light originating from any particular row of mask 35 to a corresponding row of elements of an LCD 41. The element's neighbour images light from this particular row to a row of LCD 41 which is spaced by two row pitches from the corresponding row. In other words, rows 42 of mask 35, which present the same arrangement of blocking and transmitting regions to lenticular screen 37, all provide light to alternate rows of the LCD and in such a manner that these are seen by the observer's left eye 43. Conversely, rows 44 of the mask, in combination with lenticular 37 and lenticular 40, provide light for the other interleaved lines of the LCD, and direct this to the observer's right eye 45. A head tracking system 46 senses the co-ordinates of the observer and controls the position of mask 35 and screen 37 to ensure that the viewing zones for the left and right eye images are correctly positioned for the observer. The embodiment of FIG. 4 has the useful attribute, that it can be adapted for screens of any size without an increase in the structure's overall depth. Also illustrated in the embodiment is an optional transmissive sheet 47 which comprises scattering centres. These may be switched electrically from an operative state to one where the sheet is rendered transparent. A typical example of such a screen is one in which small regions of liquid crystal material are suspended in a plastic matrix. When transparent, the structured light source operates normally to provide a three-dimensional image. When the sheet scatters light, it acts as a diffuser and the display may be used conventionally as a two-dimensional display. In a system where both two-dimensional imaging to full resolution and autostereoscopic imaging to half the full vertical resolution are required, similar structures with only vertical diffusion properties and electrically switchable are conveniently placed immediately in front of the LCD (not shown) and are operable in a manner similar to that of sheet 47.

Figures 5A, 5B:
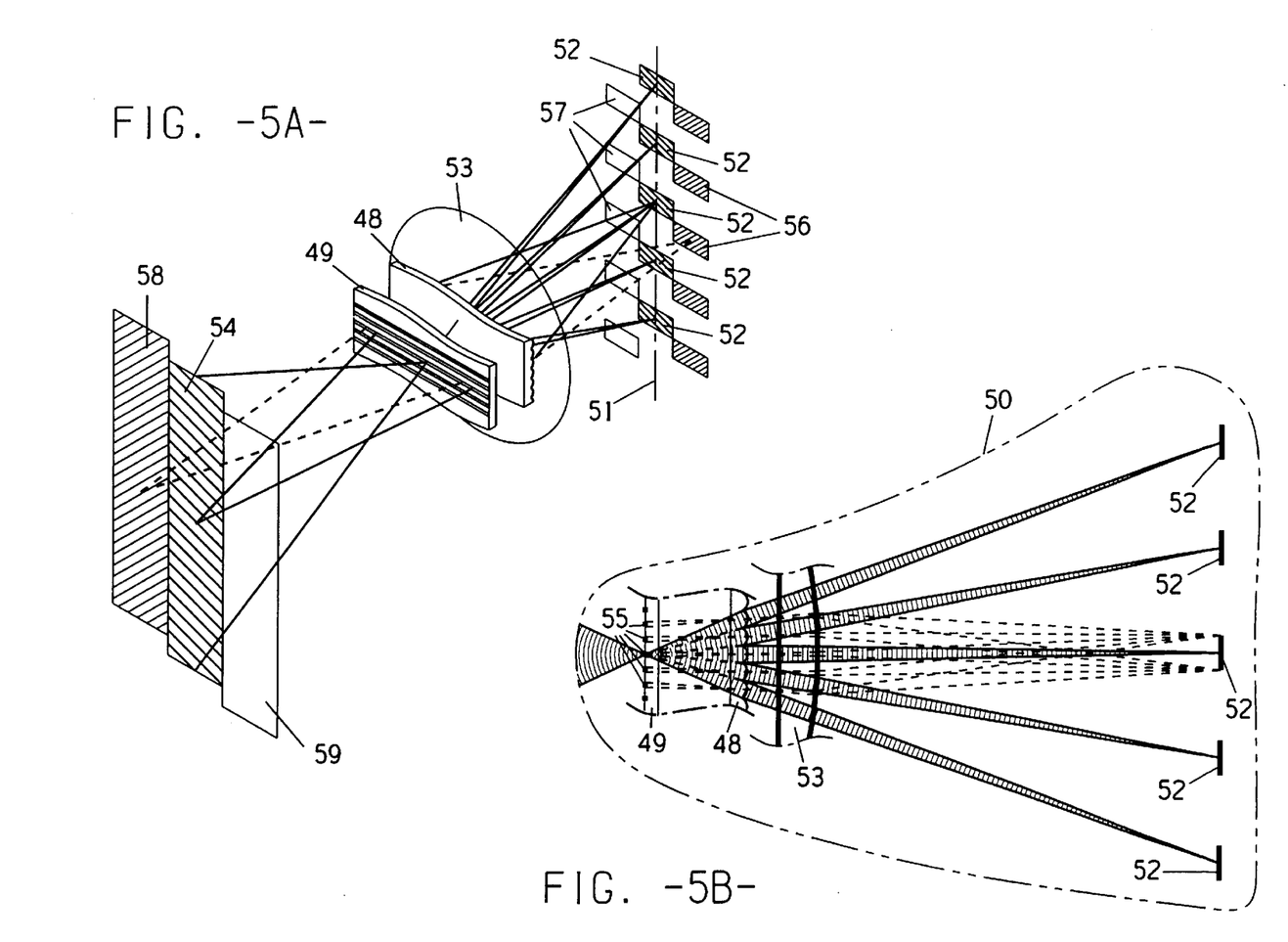
FIG. 5 shows another embodiment of the invention.

In FIG. 5, a different form of the current invention is illustrated. The structured light source is essentially of the same form as that of FIG. 4, that is to say, an array of vertically spaced convergent elements in the form of lenticular screen 48 is positioned behind an LCD 49 having a number of rows of light modulating components. The spacing of the LCD's rows and that of the convergent elements is closely related. However, whereas the imaging characteristic of the elements of screen 40 of FIG. 4 and the portion of screen 29 of FIG. 3 are essentially to provide a near 1:1 magnification in a vertical plane of mask rows on to the LCD's rows, the cylindrical elements of screen 48 are arranged to vertically image a more distant arrangement of apertures on to the LCD's image forming elements. FIG. 5 shows the arrangement in part as an isometric view and, for clarity, a magnified section 50 along the optical path through vertical line 51 is provided.

Turning to section 50, apertures 52 placed in front of a conventional diffuse light source (not shown), provide light by transmission to a field lens 53. The prime function of lens 53 is to re-image apertures 52 to the lateral location of one eye of an observer. This is shown as the hatched area 54 in the main figure. In fact, in this embodiment, apertures 52 are spaced vertically so that the gap between them is twice the height of an aperture. The light from this vertical array of apertures is spread vertically by the action of the cylindrical lens elements of screen 48, so that the vertical dimension of region 54 is uniformly filled with image light. This is illustrated in the sectional view by the hatched regions between representative light rays from the centre of each aperture. This also illustrates a very important feature of the structure, which is that each aperture is imaged vertically by the action of an element of the lenticular screen so that its light is concentrated into a set of narrow bands 55. The gap between these horizontally extending bands of light from apertures 52 is, to a good approximation, twice the height of each band. This is the same mark to space ratio as for the apertures, in the vertical dimension. LCD screen 49 has a pitch between rows, which is one third of the pitch between bands 55. By vertical alignment of apertures 52, every third row of the LCD's light modulating elements is illuminated by light from apertures 52, and arrives at region 54. Two other columns of apertures 56 and 57 are provided to either side of the column of apertures 52 thereby forming a patterned mask. Columns 56 and 57 are respectively moved down and up by the height of one aperture. Light from these columns of apertures is imaged by field lens 53 and lenticular 48 in tile same way as that from 52, except that the positions of the corresponding narrow bands of light on the LCD are shifted vertically from that of bands 55 and the region at the observer's location receiving light from these bands is shifted horizontally. For apertures 56, the bands move up by one LCD row spacing and the region 58 is found to the left of region 54. For apertures 57, the bands move down by one LCD row spacing and the region 59 is found to the right of region 54. This arrangement allows the presentation of three different perspective views, simultaneously. A reduction to two views is self evident, as is an increase to more than three. The constraint on the system is that the pitch between bands of light concentrated by the lenticular screen should be arranged to match an integer multiple of the row spacing of the LCD. The apertures may comprise a programmable mask, in the form of regions of a spatial light modulator, such as an LCD. In this way the pattern of the mask can be changed dynamically, for example to track the observer. A light source behind a lenticular can behave as an aperture.

It may be shown that many arrangements, which are hybrids of the embodiments of FIG. 3 and FIG. 5, may be constructed, provided certain relationships are maintained between the pitches between vertically adjacent elements of each of the apertures or sub-sources ($P_s$), the array of convergent elements ($P_L$) and selected (typically alternate) rows of modulating elements of the LCD ($P_T$). This relationship takes the form $$P_S=(P_T \times P_L)/(N \times P_T - P_L),$$

where N is an integer.

The focal length of the convergent elements follows from the spacing between these three components of the system and ensures that the array of apertures is correctly imaged to the plane of the LCD.

Many configurations conforming to the basic principles of this invention are possible. In the embodiment of FIG. 5 as described, light from adjacent apertures 52 is concentrated through neighbouring lenticular elements to the same light band. Another arrangement uses larger lenticular elements to cover four LCD rows. Used as described, four staggered columns of apertures would provide four viewing zones. If the vertical pitch of such apertures is halved, then these are imaged in pairs by the lenticular, and a two view system would result, by reprogramming. By using multiple apertures at the same vertical height, the same image may be viewed in different locations, allowing for multiple viewers. By swapping horizontal positions of left and right eye apertures on a frame by frame basis, whilst changing the content of the video displayed on the corresponding lines of the LCD, any horizontal line structure in the image may be substantially eliminated. All or some of the apertures, a field lens and other convergent optical elements, may be emulated or provided by a holographic recording located behind the LCD. By moving the location of the light source which plays back this hologram, a degree of head tracking can be achieved. By separating the light source into two or more compact sources spaced vertically, each providing different spectral components, one colour for one perspective view may be displayed together with its complement for another perspective view on the same row of the LCD.

Figure 6:
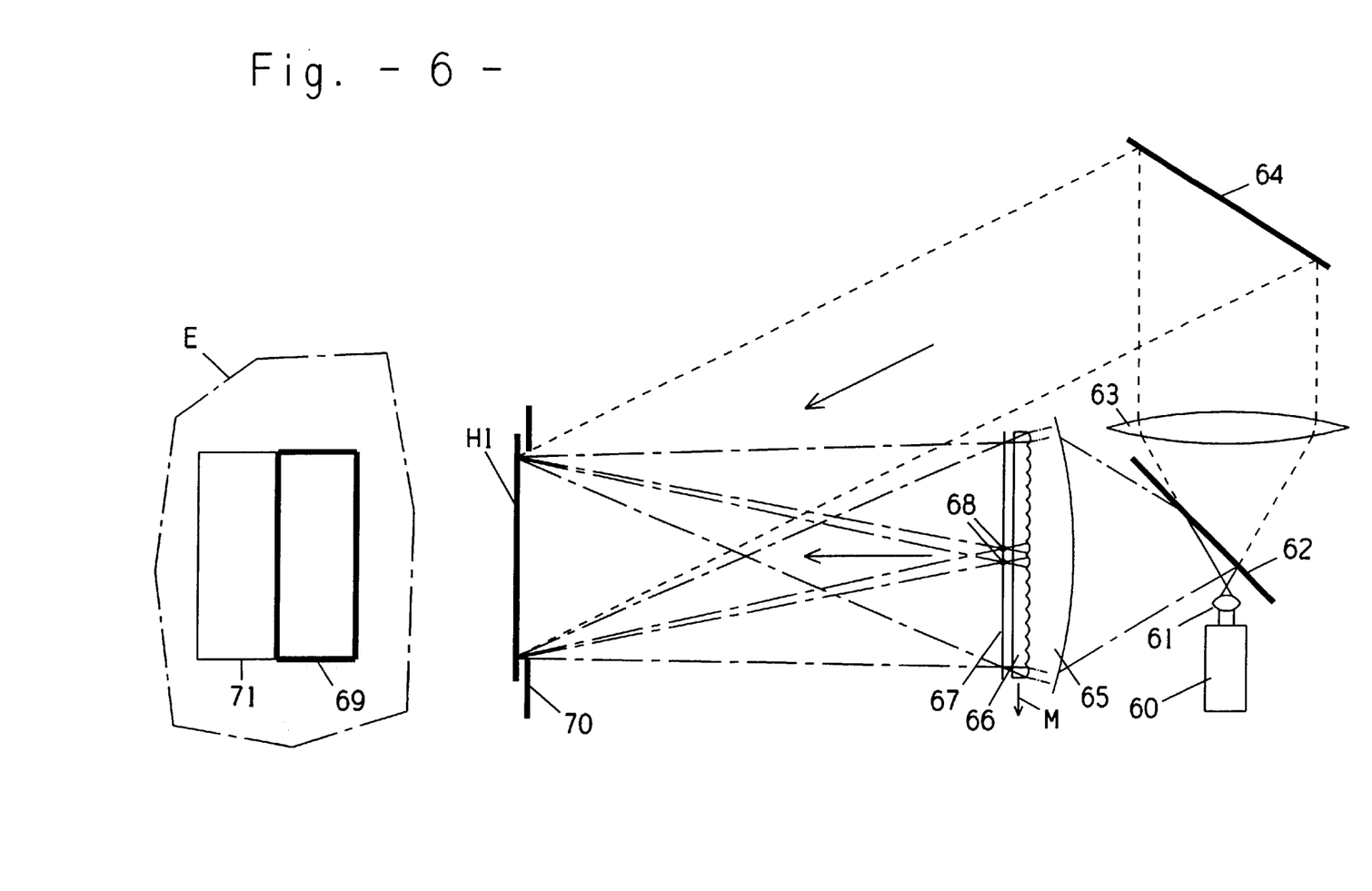
FIGS. 6 and 7 illustrate a technique for the recording of a holographic optical element for use in accordance with the invention.
Figure 7:
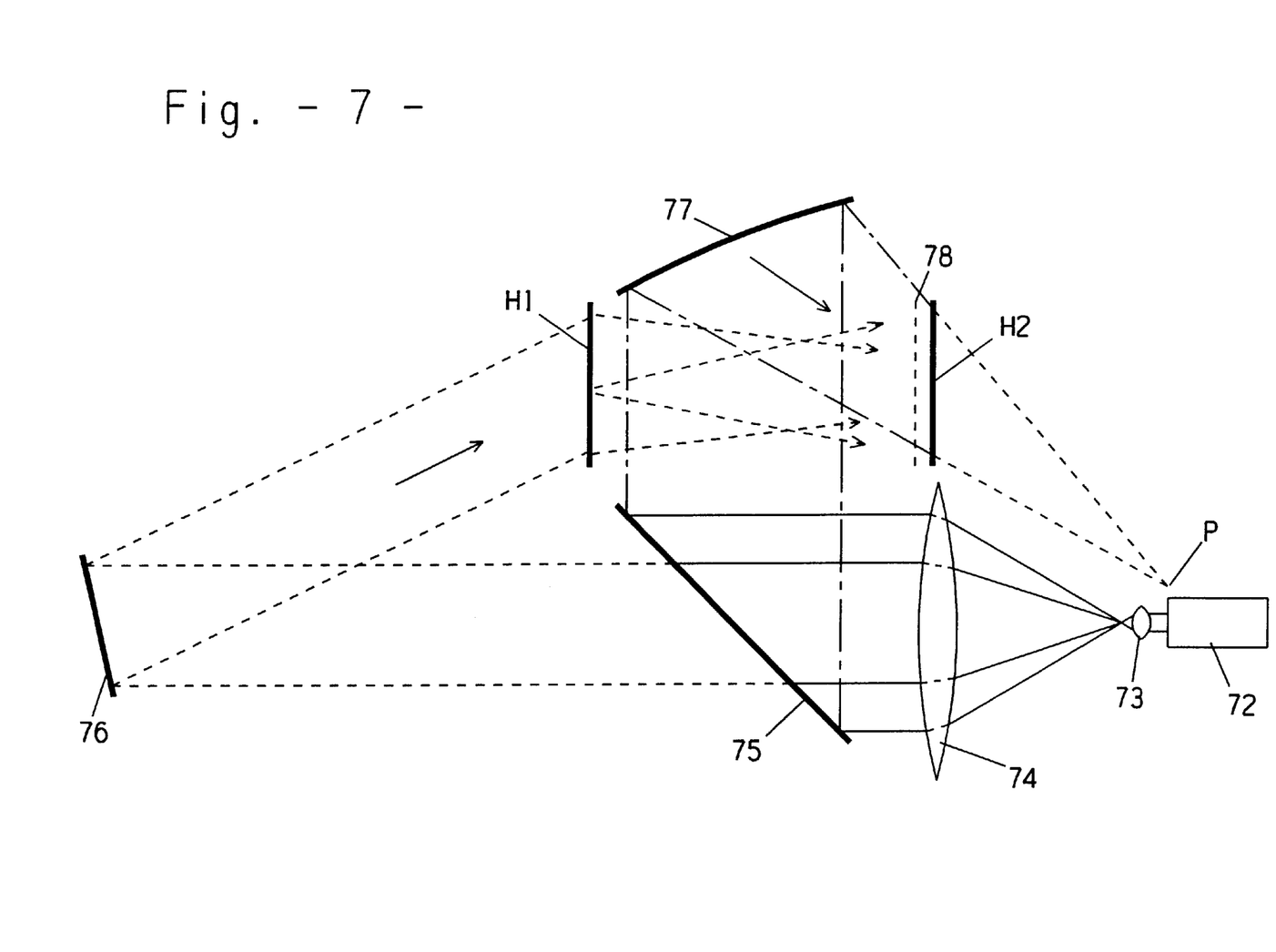

Apparatus and a method for making, in two steps, a holographic optical element (HOE), suitable for use with this invention, is described with the aid of FIGS. 6 and 7. In FIG. 6, a coherent light source 60, such as an Argon laser operating at a wavelength of 514.7 nMs, provides light, via a short focus lens 61 and a beam splitter 62 to the two paths of an optical arrangement for recording a primary hologram H1. Lens 63 collimates the light for a reference beam, directed at H1 via a mirror 64. Lens 65 converges light in the main (illuminating) path of the apparatus, so that at all points of a rectangular area, equivalent in size to the display screen for which the resulting HOE is intended, light is travelling towards a point at H1, nominally positioned at the optimum observer distance from the HOE. In the current embodiment, an array of cylindrical convergent elements 66 is placed in the optical path between lens 65 and H1. A diffusing screen 67 is positioned close to the focal plane of array 66. A series of lines of light (shown as points 68 in the sectional view of FIG. 6) is formed on diffuser 67 by array 66 and the width of these lines may be adjusted by fine tuning the spacing of diffuser 67 with respect to array 66. The vertical pitch between the cylindrical elements of screen 66 is arranged to ensure that the spacing of the lines corresponding to points 68 is an integral multiple of the vertical pitch of the LCD screen to be used in an autostereoscopic display in accordance with the current invention. A rectangular aperture 69 shown in the auxiliary front elevation E and as a vertical gap in the main sectional view through an aperture plate 70, ensures that light from diffuser 67 and the reference beam from mirror 64 combines to form a holographic recording within the boundaries of aperture 69 on H1. The dimensions of this rectangular area correspond to the format of the viewing zone for one eye of an observer, and, when the final HOE, or H2, is made in a second stage process (see below with reference to FIG. 7), this is where the light from a subset of the horizontal lines of the LCD is observed, providing the light source used to play back the holographic recording is positioned at the convergence point of the reference beam for the recording of H2. The recording of H1, however, is completed, after moving the array 66 in a direction normal to the direction of the cylindrical elements, as indicated by arrow M, so that the light lines formed by it are shifted to an intermediate position, corresponding in use to the other or another subset of rows of the LCD. These are recorded at a second rectangular aperture position 71 on H1. The two recordings correspond to different viewing zones for the two eyes of the observer. If the spacing between points 68 is more than two times the LCD row spacing, further viewing zones may be recorded in this way.

The final HOE is made as a second generation hologram H2 from the master H1. This is illustrated with the aid of FIG. 7. Laser 72 and lenses 73 and 74 provide a collimated beam of coherent light. This is split by beam splitter 75 into a reading beam directed at H1 via mirror 76 and a reference beam for making the new recording H2. The reference beam is converged by an off-axis parabolic reflector 77 towards a location P on the opposite side of H2. When H2 has been processed, it comprises a HOE with the property that, if illuminated from the point P, light from a series of lines, corresponding to those produced by array 66 of FIG. 6 and spaced at an integral multiple of the LCD row spacing, is observed within one viewing zone, and light from an interdigitated set of lines is observed at another viewing zone. By ensuring that H2 is located at a modest distance (say 10 mms) behind the plane 78 of the light lines formed when H1 is illuminated by the reading beam, the final recording may be positioned at this distance behind the LCD, in use. The light lines formed when the HOE is illuminated from a point corresponding to P in FIG. 7, can then be made to coincide with the rows of the LCD. With suitable image data presented on the rows passing light directed towards each respective eye of the observer, an autostereoscopic image is observed.

The HOE formed using a series of cylindrical convergent elements as illustrated in FIG. 6, provides a structured light source which illuminates complete lines of the LCD for each eye. Alternative arrangements may be used to segment the LCD in a different manner. In one such alternative, a mask is located at the plane where previously the light lines were to be formed. The diffuser is positioned between lens 65 and this mask, so that every aperture of the mask illuminates the entire area of H1. The pattern of apertures is arranged to match a subset of the modulating elements of the LCD. For each viewing zone, constructed at H1 in the manner already described, the mask is moved to select a new subset (minimum number 2) of the locations of LCD elements. Now, when H2 has been recorded, the arrangement of elements representing any one perspective view of the autostereoscopic image, can comprise elements arranged in a variety of different ways. A chequered pattern would be typical for a two view configuration. In fact, the HOE comprises at least two co-located arrays, one for each viewing zone, of convergent optical elements by virtue of the recording process, as each aperture of the original mask will have been recorded in this form, once for each viewing zone. Light originating at P is converged towards an array of points by 112 prior to arriving at one of the respective viewing zones. For a colour LCD in which each pixel (picture element) typically comprises three horizontally spaced sub-pixels, each of a different primary colour, alternate sub-pixels may be assigned to each view, thus preserving a relatively high horizontal resolution, providing the image data is correctly processed. Given the underlying chequered pattern of elements comprised in one perspective view, an additional important attribute is provided. The structure of many LCD's is one in which the elements of one colour are arranged in a vertical stripe pattern. A preferred pattern for analogue images, as opposed to digitally generated ones, is to arrange sub-pixels in a delta or triad configuration. The regime imposed by the segmentation of left and right eye images by the chequer board selection of sub-pixels from the vertical stripe configuration, is to provide a pattern similar to the delta configuration for each eye.

Figure 8:
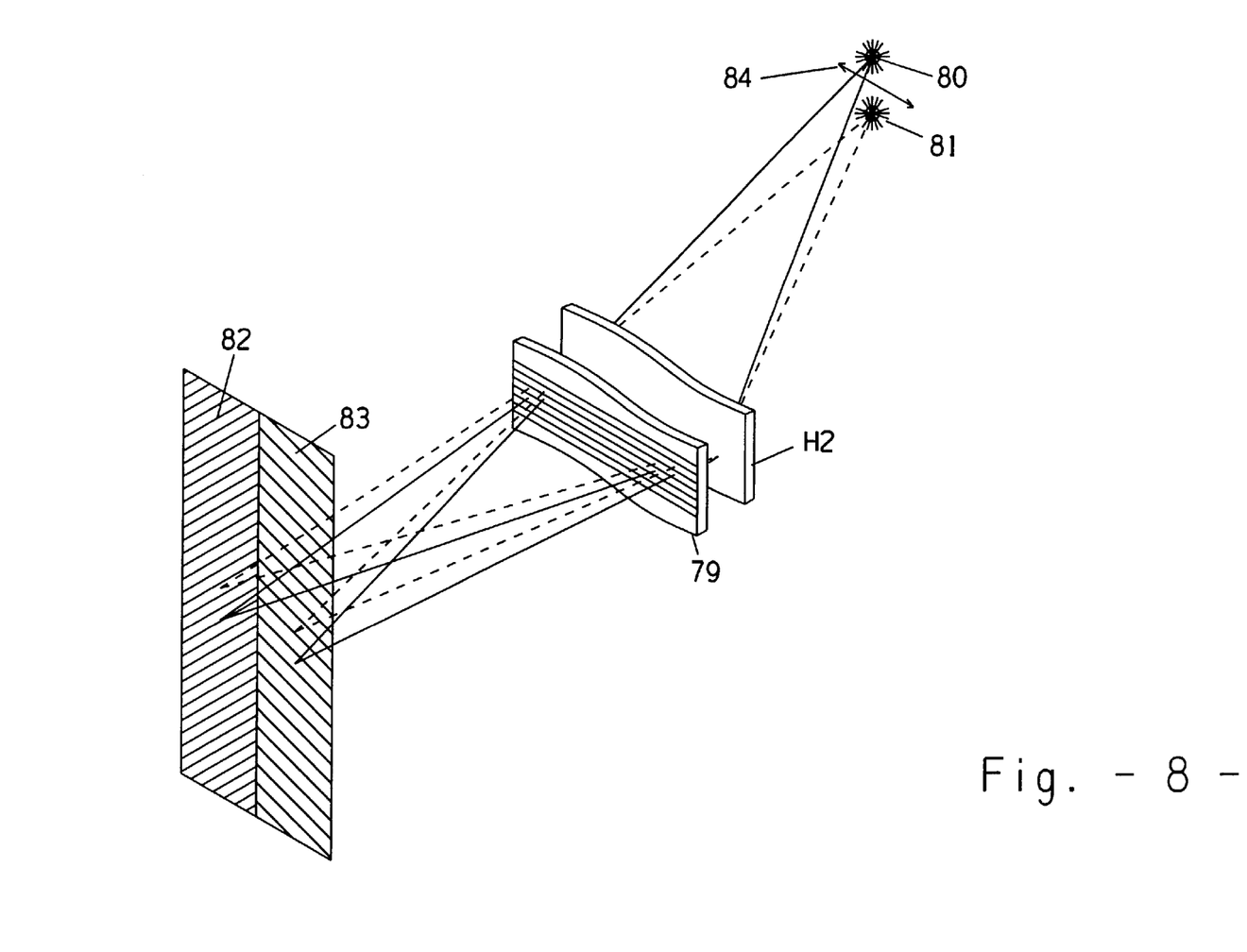
FIG. 8 illustrates apparatus which includes a holographic optical element in accordance with the invention.

A simple embodiment of the invention in which the HOE provides alternate lines for each of two viewing zones but the illumination of the HOE is arranged so that for different spectral components the same view is displayed on adjacent lines thereby achieving a more evenly distributed set of sub-pixels is illustrated with reference to FIG. 8. The HOE H2 is positioned behind an LCD 79. A small portion of each is shown. Two light sources, one providing magenta light 80 and the other providing green light 81 are spaced vertically and positioned behind the HOE H2. The vertical spacing of the sources 80 and 81 is such that the vertically spaced concentrations of magenta light formed for one viewing zone 82 are displaced by one row vertically from the spaced concentrations of green light formed for the same viewing zone. Conversely the magenta light reaching the other viewing zone 83 emanates from the LCD rows which provide green light to zone 82 and green light reaches zone 83 from the rows providing magenta light to zone 82. The result is a configuration of sub-pixels (red green and blue) for each eye which is well balanced in luminance for all lines of the LCD.

Head tracking is achieved, by selecting the correct location for the light source. Where, as in the above example, horizontal light lines are employed to illuminate an entire row of the LCD, the location of the source may be selected from a continuum in a horizontal direction, as illustrated by arrows 84. Where the illumination provided by the HOE is in the form of points or small areas or concentrations of light spaced both horizontally and vertically, selection from a discrete plurality of locations of the light source will cause it to illuminate the same set of modulating elements of the LCD, whilst providing a slightly different location for the viewing zones corresponding to each eye. For example, if the horizontal spacing between modulating components or the LCD, corresponding to the same view of an autostereoscopic image, is 0.176 mm and the distance of the HOE from the LCD is 10 mms, then a change of direction in the horizontal plane of the light from the HOE arriving at the LCD of one degree will produce an array of concentrations of light coincident with the same modulating components. If the viewing zones are spaced from the display by 700 mms, a typical viewing distance, then each of these will be shifted horizontally by 12.3 mms. If the concentrations of light are arranged in chequer board fashion, then a small alternating vertical change in the light's direction, from the HOE to the LCD, allows the horizontal tracking increment to be halved to one half of a degree, which is fine enough for practical purposes. In order to accommodate a wide range of viewing distances from the display, the light source may be moved in a direction towards or away from the HOE. Alternatively, the display's area may be segmented and the direction of the light from each segment modified according to the segment's location and the observer's distance. This segmentation may be achieved when recording H2, by providing for a series of light sources each having a nominal location behind H2, or by structuring the light source at its location to be directionally selective. A good example of such a structured light source is a programmable spatial light modulator, such as an LCD, positioned at the focal plane of a lenticular screen, with this combination located in front of a conventional, extended light source. If each lens of the screen has four elements of the LCD behind it, then the display area can be segmented into four vertical bands or segments, each effectively having its own programmable light source.

A further crossed array of cylindrical convergent elements added to the embodiment of FIG. 5 and with its pitch and that between illuminating apertures horizontally correct, provides illumination in the form of points or small areas spaced both horizontally and vertically. This allow segmentation of the LCD in a chequer board fashion and selection from a discrete plurality of locations of the light sources or apertures to illuminate those elements of the LCD assigned to each eye, whilst providing different locations for the viewing zones corresponding to that eye. Likewise, a HOE comprising only one recorded viewing zone may be used with a plurality of light sources to select LCD elements for and direct light to different eyes of the observer. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. Apparatus for the display of an autostereoscopic image, comprising a real and/or virtual image forming region to be viewed by an observer; optical means for providing a first point or region of concentration of light, said light providing an image of a first single perspective of a scene at said image forming region, and a first void point or region, spaced from said first point or region of concentration, substantially void of light from said first single perspective image; said optical means comprising, in combination, a source of light; a screen having a substantially evenly spaced plurality of juxtaposed lens elements; an apertured surface having a corresponding first plurality of substantially vertical columns associated with said first point or region of concentration of light interleaved with a corresponding second plurality of substantially vertical columns associated with said first void point or region, said apertured surface being positioned close to said screen between said screen and said source of light; a spatial light modulator for generating an image at said image forming region intermediate said optical means and the observer; and control means for co-locating, in use, said first point or region of concentration of light with a first eye of the observer and said first void point or region with the second eye of the observer.

2. The apparatus of claim 1 in which the optical means provides, in use, a second point or region of concentration of light co-located, in use, with the first void point or region, said light providing an image of a second single perspective of the scene at the image forming region, and a second void point or region, co-located with the first point or region of concentration of light, substantially void of light from said second single perspective image, the second plurality of substantially vertical columns of the apertured surface having the same association with the second point or region of concentration of light as the first plurality of substantially vertical columns has with the first point or region of concentration of light.

3. A method for the display of an autostereoscopic image having at least two perspective views of a scene which comprises providing a source of light; positioning a spatial light modulator (SLM) having a plurality of light modulating elements intermediate an observer and the source of light; and structuring the light from said source so that a first perspective view of the scene is seen by one eye of the observer and a second perspective view of the scene is seen by the other eye of the observer, characterized in that structuring the light includes forming, with convergent optical elements intermediate the source of light and the SLM and in an interleaved manner for the views of the image, a set of vertically spaced concentrations of light for each view which substantially map onto a respective set of elements of the SLM.

4. Apparatus for the display of an autostereoscopic image having at least two perspective views of a scene comprising a source of light; a spatial light modulator (SLM) having a plurality of light modulating elements intermediate an observer and the source of light; and means for structuring the light so that a first perspective view of the scene is seen by one eye of the observer and a second perspective view of the scene is seen by the other eye of the observer, characterized in that said light structuring means includes a light concentrating arrangement, disposed between the source of light and the SLM and having convergent optical elements, which forms, in an interleaved manner for the views of the image, a set of vertically spaced concentrations of light for each view which is substantially mapped onto a respective set of elements of the SLM.

5. Apparatus as claimed in claim 4 wherein the light concentrating arrangement further comprises a patterned mask with light blocking and transmitting regions and an array of the convergent optical elements for focusing in a vertical plane the light from a point of the mask substantially at the plane of the SLM.

6. Apparatus as claimed in claim 5 wherein the mask is chequered having horizontal rows and substantially vertical columns, each row and column comprising alternate light blocking and transmitting regions.

7. Apparatus as claimed in claim 6 in which the columns are tapered.

8. Apparatus as claimed in claim 6 wherein said light structuring means comprises a further array of convergent optical elements, said further array providing for a row-of the mask at least a part of the spectral range of one view and having substantially vertical elongate elements at a pitch corresponding to twice the column pitch of the mask.

9. Apparatus as claimed in claim 8 in which the columns are tapered and the elements of the further array have a matching taper.

10. Apparatus as claimed in claim 8 in which tracking of the observer's location is provided by controlling the direction in a horizontal plane of the light from the light structuring means in response to said observer's co-ordinate data, said control being effected by moving the patterned mask relative to the further array of convergent optical elements.

11. Apparatus as claimed in claim 10 in which tracking of the observer's lateral position comprises relative motion in a horizontal plane between the patterned mask and the further array of convergent optical elements.

12. Apparatus as claimed in claim 10 in which tracking of the observer's distance from the light structuring means is effected by relative motion between the patterned mask and the further array of convergent optical elements along an axis, said axis being substantially aligned with the elongate direction of the elements of said further array, and tracking of the observer's lateral position is effected by relative motion between the patterned mask and the further array of convergent optical elements which is orthogonal to said axis.

13. Apparatus as claimed in claim 5 in which the light blocking and transmitting is in respect of selected portions of the spectral range.

14. Apparatus as claimed in claim 5 wherein the mask comprises vertical columns and the light structuring means comprises imaging means for providing horizontally juxtaposed viewing zones corresponding to respective columns of the mask.

15. Apparatus as claimed in claim 14 wherein the imaging means is a lens.

16. Apparatus as claimed in claim 5 wherein the pattern of the mask is programmable.

17. Apparatus as claimed in claim 16 in which tracking of the observer's location is provided by controlling the direction in a horizontal plane of the light from the light structuring means in response to said observer's co-ordinate data, said control being effected by programming the pattern.

18. Apparatus as claimed in claim 16 wherein the mask is programmed so that, in use, blocking regions become transmitting and transmitting regions become blocking on a video frame sequential basis.

19. Apparatus as claimed in claim 4 in which the light concentrating arrangement comprises a holographic optical element.

20. Apparatus as claimed in claim 19 in which the light source comprises vertically spaced compact sources, each said compact source illuminating the holographic optical element with different spectral components.

21. Apparatus as claimed in claim 4 in which control means is provided for tracking the observer's location by controlling the direction in a horizontal plane of the light from the light structuring means in response to observer co-ordinate data.

22. Apparatus as claimed in claim 4 in which the SLM is a liquid crystal display.

23. Apparatus as claimed in claim 4 in which means which is electrically switchable between an optically transparent and diffusing state is positioned intermediate the observer and the light source.

24. Apparatus as claimed in claim 23 in which, in use, the SLM provides a two-dimensional image, having the full resolution of the SLM, when the switchable means is diffusing.

25. Apparatus as claimed in claim 23 in which, in use, the image of an individual row of modulating elements of the SLM is broadened vertically when the switchable means is diffusing.

26. Apparatus as claimed in claim 4 wherein the light structuring means comprises an array of convergent optical elements having a vertical pitch between elements of $P_L$ and said respective elements of the SLM have a vertical pitch between them of $P_T$ and the light structuring means further comprises, in use and in conjunction with the light source, a set of sub-sources of light, vertically spaced with a pitch substantially equal to $P_S$, where $$P_S = (P_T \times P_L)/(N \times P_T - P_L)$$

where N is an integer.

* * * * *